Figure 1:
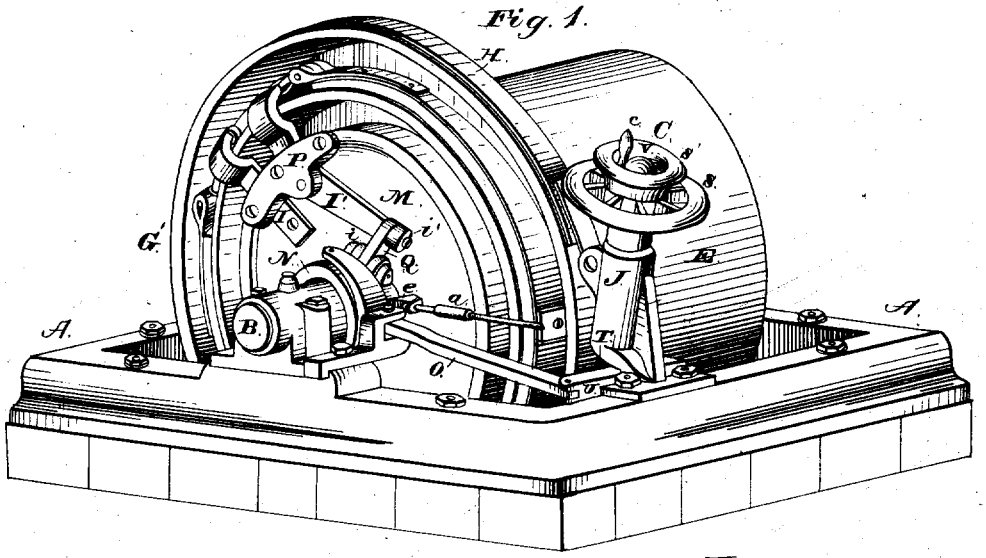

J. S. LANE.

COMBINED CLUTCH AND BRAKE OF HOISTING DRUM FOR ELEVATORS, &c.

No. 9,860. Reissued Sept. 6, 1881.

Witnesses.

Jas. E. Hutchinson.

Robert Everett.

Inventor.

Julius S. Lane, by James L. Norris.

Atty.

UNITED STATES PATENT OFFICE.

JULIUS S. LANE, OF AKRON, OHIO.

COMBINED CLUTCH AND BRAKE OF HOISTING-DRUMS FOR ELEVATORS, &c.

SPECIFICATION forming part of Reissued Letters Patent No. 9,860, dated September 6, 1881.

Original No. 203,744, dated May 14, 1878. Application for reissue filed July 30, 1881.

*To all whom it may concern:*

Be it known that I, JULIUS S. LANE, of Akron, in the county of Summit and State of Ohio, have invented a new and Improved Combined Clutch and Brake for Hoisting-Drums for Elevators, &c., of which the following is a specification.

The invention relates to a combined clutch and brake for hoisting-machinery for mines, elevators, mills, &c., which is moved or stopped at will by being connected with or disengaged from moving mechanism, and arrested at any desired point by a friction-band brake.

It also relates to the construction of the winding-drum of such hoisting-machines.

Heretofore in such machines motion has been communicated to the drum from a shaft parallel to the drum-shaft through the medium of gear or friction wheels. The drum and brake have been operated by distinct, separate, and disconnected machinery, and the band-brake has been applied by being drawn at both ends.

The first part of the foregoing arrangement is objectionable, in that it not only causes the friction of two shafts, but, if friction-wheels are used to drive the drum, this is greatly increased in the journal-bearings of the shafts. It occupies as much more space as is necessary for the counter-shaft, and requires great power to operate it, as either the drum-shaft or counter-shaft must be moved toward the other to bring the friction-wheels into contact.

The second part of the foregoing arrangement is objectionable for the reason that it is desirable to have the brake operate the moment the drum, by being disengaged from the moving machinery, ceases to revolve, which is almost impossible if the two results are to be produced by two distinct, independent, and consecutive operations; while the objection to the third part of the foregoing arrangement is found in the fact that, being drawn at each end, the band-brake is at one end drawn against the motion of the brake-pulley, thereby requiring a great outlay of power to set the brake.

Heretofore, also, in the construction of the winding-drum it has been customary to connect and brace the two heads upon which the outer casing is placed by a series of rods passing diagonally from the rim of each head to that of the other; but this arrangement affords no adequate provision for a twisting strain upon the drum, which tends to rack it.

The objects which I seek to attain by this invention are simplicity and compactness in construction; reduction of friction, by lessening the number of bearing-surfaces; ease, facility, and safety of operation; the avoiding of all shock in starting and stopping the drum, and the prevention of racking the drum by twisting strains.

The invention consists, first, in combining a hand-brake and a driving-band in such relation to each other as that ~~both can be operated~~ by one device such as a hand-wheel; second, in combining a hand-brake with a driving-band in such relation to each other that either can be operated by an independent device, such as a hand-wheel, said wheels being adapted to be connected and operated by one motion; third, in combining a hand-wheel for operating the driving-band with a hand-wheel for operating the brake-band adapted to be operated together with a differential device for locking them together; fourth, in combining with the driving-band of a hoisting-machine a series of radial arms attached at one end to the driving-band and arranged by encountering inclined surfaces at the other to raise the band from contact with the surface of the band-pulley; fifth, in combining with the drum-heads a flanged cylinder; sixth, in the construction of one of the drum-heads having an inner and two outer flanges; also, in certain features of construction and combination hereinafter fully set forth and claimed.

Figure 3:
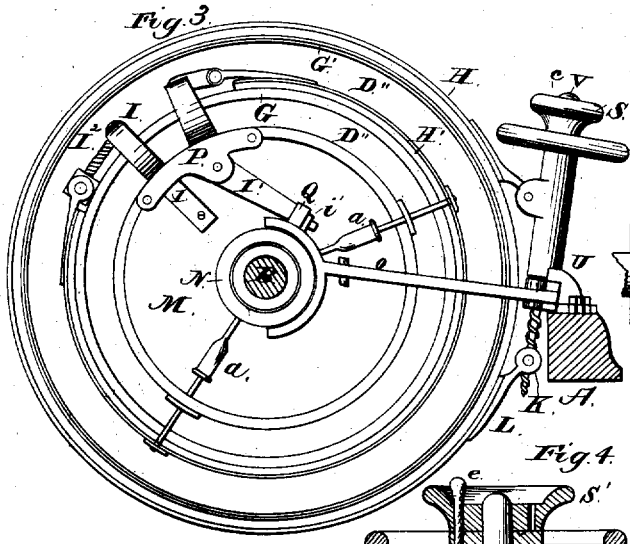
Figure 2:
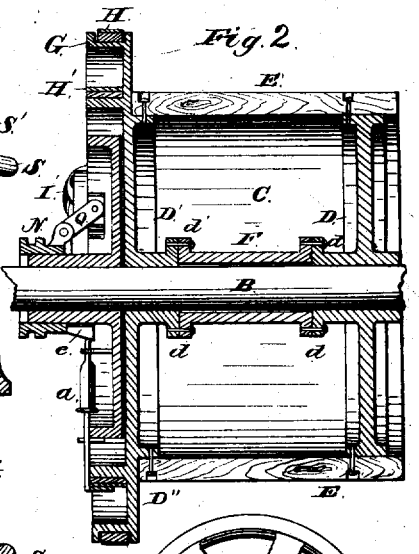
Figure 4:
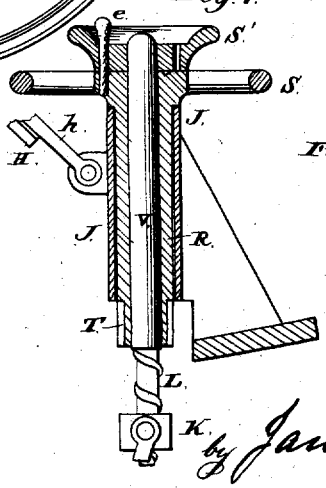

In the accompanying drawings, in which similar letters of reference indicate like parts, Figure 1 is a perspective view of my improved hoisting-machine. Fig. 2 is a longitudinal section of the drum with driving and brake mechanism, on line *x x* of Fig. 3. Fig. 3 is an end elevation of the same; Fig. 4, a central vertical section of the hand-wheels, shafts, and posts enlarged; and Fig. 5 a plan view of the two hand-wheels enlarged, exhibiting the differential connection.

A indicates the frame, which is provided with suitable journal-boxes for the rotary-shaft B, that supports the drum and its connections, and to which shaft the driving-power is directly applied. The winding-drum C is mounted loosely upon the shaft, so as to revolve freely thereon when not held in connection with the same by means of the driving-band and auxiliary devices hereinafter to be described. The winding-drum is composed of two ends or heads, D D′, upon the peripheries of which is bolted the cylindrical casing E, which can be made of wood. In order to form a central connection between these heads of the winding-drum each is provided with an inwardly-extending hub arranged to revolve with the heads freely upon the shaft, and at the inner ends of these hubs I form flanges *d d′*. Between these flanged ends of the hubs and upon the shaft is arranged a hollow sleeve or cylinder, F, having an internal diameter greater than the diameter of the shaft, the said cylinder being also provided with annular end flanges corresponding with the flanges of the hubs. The flanges of the hubs and those of the interlocking cylinder are bolted securely together, thereby rigidly connecting the heads of the drum and preventing any racking from a twisting strain.

The head D′, at one end of the drum, is provided with an inner annular flange, $D^2$, which fits into the drum, so as to connect the said drum and head and support the latter at this end, the head being enlarged so as to form an annular flange, D″, which flange, together with the outer face of the head, constitutes a disk having a greater diameter than the diameter of the drum. From the outer face of the flange D″ at this end of the drum project two annular webs or flanges, G G′, these flanges being accurately turned concentric with each other and constituting, in effect, an inner and outer pulley, both in rigid connection with the winding-drum. The brake-band H, for checking the rotation of the drum, is applied to the pulley formed by the outer one of these flanges, and to the inner one of said pulleys is applied the driving-band H′, by means of which motion will be imparted from the driving-shaft to the drum. These bands can consist of metallic belts, and may be lined, for instance, with bent wood, with the grain running lengthwise of the belt.

One end of the brake-band is connected with a hollow post, J, on the main frame by means of a link, *h*, which is pivoted to lugs upon the post, the remaining end of the brake-band being attached to a nut, K, arranged upon the screw-threaded end L of a solid shaft, V, which is arranged to turn within the hollow post. This shaft is provided at its upper end with a handle or hand-wheel, S′, by means of which the shaft can be conveniently rotated in order to cause the nut connected with the brake-band to move up or down, for the purpose of tightening or slackening the brake-band.

The driving-band H, which is applied to the inner pulley formed by one of the annular flanges of the enlarged head of the drum, is attached at one end to a bar, I, by means of an adjustable screw-coupling, $I^2$, said bar being rigidly secured to a disk, M, which is slightly separated from the enlarged head of the drum and keyed to the driving-shaft, so as to revolve with it. The remaining end of the driving-band is attached to the outer end of a lever, I′, which is pivoted to the outer side of the disk M, under a plate, P, the lever having its inner end extending to a point alongside of the driving-shaft. The hub of the disk to which this lever is pivoted is prolonged on the side opposite the head of the drum, and is turned smooth to admit of the collar N sliding freely thereon. This collar, while capable of being moved upon the hub toward and away from the disk, rotates with the disk and shaft, and is formed with a circumferential groove that receives the forked inner end of a pivoted lever, O, the pivot of said lever being fixed in a suitable bearing on the frame of the machine.

In order to operate the lever that is attached to the driving-band, I pivot a link, Q, to the long inner arm of the lever and to lugs upon the sliding collar N, and at such points of connection I arrange small anti-friction steel rollers *i* upon the pins on which the link turns, which wheels serve to lessen friction between said operative parts.

Within the hollow post J is fitted a hollow shaft, R, adapted to turn within the hollow post, and provided at its upper end with a handle or wheel, S, to enable the operator to control and operate the same. This hollow shaft incloses the solid central shaft which is provided for operating the brake-band, as aforesaid, the said hollow shaft being provided at its lower end with a pinion, T, which engages a movable rack-bar, U. The outer end of the forked lever is pivoted to this movable rack-bar, whereby a rotary movement on the part of the hollow shaft will cause the collar to slide upon the hub of disk M, toward or away from the disk, according to the direction in which the hollow shaft is turned by the operator. The solid central shaft V passes up through the hand-wheel of the hollow shaft, and has its handle or hand-wheel arranged just above the handle or hand-wheel of the latter.

Each handle or hand-wheel is provided with a series of perforations, (shown in full and dotted lines in Fig. 5,) whereby, when a locking-pin, *c*, is passed into coincident perforations of said wheels, their two shafts will be connected, and the rotation of either handle or hand-wheel will necessarily cause a simultaneous movement in the same direction of both shafts. When power is applied, so as to rotate shaft B, the drum will remain stationary so long as the brake-band is tightened upon the outer pulley of the drum, and the driving-band applied loosely, so as to slide around or move loosely upon the inner pulley, G. Now, if the hand-wheel S be turned in one direction, said handles or hand-wheels being locked together, the shafts of the two hand-wheels will be simultaneously turned upon their axes, the screw-threaded end of the central shaft, V, causing the nut connecting with the brake-band to move toward the lower end of said shaft, and hence slacken the brake-band upon the outer pulley of the head D′. The pinion upon the hollow shaft R will, during the above movement, cause the rack-bar to slide and throw forward the long arm of the forked lever, the shorter forked end of which will cause the collar to move upon the hub of disk M toward the latter, and hence move the long arm of lever I′ in a lateral direction from the driving-shaft, whereby the short outer arm of said lever I′ will draw the end of the driving-band with which it connects toward the end of the band that is connected with the bar I, fixed upon the disk, thus tightening the driving-band upon the pulley G of the drum. This action connects the drum-head with the disk which is keyed upon the shaft, so that the shaft will cause the drum to revolve, together with the disk and the collar N, upon the disk-hub.

A reversal of the above operation will turn the screw-threaded end of the shaft V on the nut connected with the brake-band, so as to cause the nut to rise and hence tighten the brake-band, while at the same time the collar N will be moved away from the disk by means of the devices just described, whereby the driving-band will be slackened upon pulley G, and thus, while being carried round with the disk M, it will move past the face of the pulley without rotating the same.

By the arrangement described the drum can be started and also its motion arrested gradually without imparting jars and shocks to or breaking portions of the machinery.

It will be obvious that the driving-band and the brake-band can be operated independently, if desired, by removing the locking-pin *c*.

Figure 5:
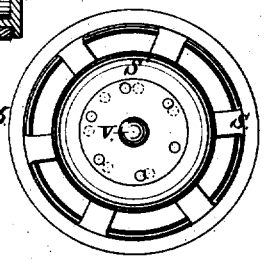

To enable the handles or hand-wheels S S′ to be locked together at any desired point in adjusting for wear or otherwise, the perforations in said wheels are pierced in coincident circles and equidistant from each other, the number of perforations in one wheel exceeding by one the number of perforations in the other, as indicated in Fig. 5, in which the dotted lines indicate the position of the holes in the lower wheel, by which arrangement but slight movement is required on the part of one wheel to find coincident holes for the locking-pin.

In order to prevent contact between the driving-band and the pulley G when the latter is at rest, two or more rods, *a a*, are employed, provided with adjustable screws *a′*, which pass through suitable guides on the disk, and are connected with the driving-band. These rods are all arranged in lines radially from the driving-shaft, and are adapted to be moved laterally with respect to the same. A corresponding number of wedge-shaped projections *e e* are formed with or secured to the inner end of the collar N at said points, that when the said collar is thrown outward to slacken the driving-band the wedges will act against the inner ends of these rods, and thence force the same outward, so as to raise the driving-band and maintain it clear of the inner pulley. When the collar is moved toward the disk the ends of the rods will be relieved of the wedges, and hence the rods will be forced inwardly as the driving-band is tightened up.

Having thus described my invention, what I claim, and desire to secure by Letters Patent, is—

1. In a hoisting-machine, the combination of a band-brake and a driving-band, both operated by one handle or hand-wheel, substantially as herein shown.

2. In a hoisting-machine, the combination of a band-brake with a driving-band, each operated by an independent handle or hand-wheel, said wheels being adapted to be connected and operated by one motion, substantially as and for the purpose hereinbefore set forth.

3. The combination, in a hoisting-machine, of a hand-wheel for operating the driving-band, with a hand-wheel for operating the brake-band, adapted to be operated together, and with a differential device for locking them together, substantially as and for the purpose hereinbefore set forth.

4. In combination with the driving-band of a hoisting-machine, a series of radial arms attached at one end to the driving-band, and arranged, by encountering inclined surfaces at the other, to raise the band from contact with the surface of the band-pulley, substantially as shown, for the purpose specified.

5. In combination with the drum-heads D D′, the flanged cylinder F, substantially as and for the purpose specified.

6. The combination, in a hoisting-machine, of the winding-drum loosely mounted upon the driving-shaft with the disk or wheel M, keyed to the said shaft alongside of the winding-drum, the brake-band, and the operating mechanism, constructed and arranged to constitute a connection between the disk and the drum when operated for the purpose of causing the rotary motion of the shaft to be transmitted to the drum, substantially as described.

7. The combination, with the brake-band and the driving-band, of the driving-shaft, the drum loosely mounted on the shaft and having its head formed with an inner annular flange fitting into the end of the drum, and with the two outer annular concentric flanges constituting pulleys, one for the brake-band and the other for the driving-band, substantially as described.

8. The combination, with the winding-drum, loosely mounted upon the rotary shaft, of the disk keyed upon the shaft alongside of the drum, the sliding collar connected by a pivoted lever with the driving-band, the inclines upon the collar, and the rods connecting with the driving-band and adapted to be thrown outward by the said inclines when the collar is moved away from the disk, substantially as described.

9. The combination, with the loosely-mounted drum, of the brake-band for locking said drum, connected with devices for tightening or slackening it, and the driving-band adapted to hold the drum in connection with the driving-shaft, with mechanism for operating the driving-band to effect such connection or to release the driving-band from frictional contact with a pulley upon drum, substantially as described.

10. The combination, with the rotary shaft V, provided with a screw-threaded portion carrying a nut connected with the brake-band, of the hollow shaft R, provided with a pinion engaging a sliding rack-bar, the lever pivoted to said rack-bar, and the devices actuated by the pivoted lever and arranged to tighten or slacken the driving-band upon a pulley of the winding-drum, substantially as described.

11. The combination, with the winding-drum, of the driving-band, a jointed lever arranged to tighten the driving-band, the sliding collar N, connected with the pivoted lever, and a lever arranged to cause the collar to slide upon the driving-shaft, substantially as described.

12. In a combined clutch and brake for a rotary drum, the combination, with a brake-band, of the driving-band, each operated by an independent handle or hand-wheel, substantially as described.

13. The combination, with the pulleys and the driving-band, of the mechanism constructed substantially as described, and arranged to apply the brake-band to one pulley when the driving-band is freed from the other pulley, substantially as described.

In testimony whereof I have signed my name to this specification before two subscribing witnesses.

JULIUS S. LANE.

Witnesses:
C. P. HUMPHREY,
E. W. STUART.